United States Patent [19]
Higatsberger et al.

[11] 3,805,079
[45] Apr. 16, 1974

[54] APPARATUS FOR DETERMINING THE CARBON CONTENT OF A FERROUS MATERIAL DURING STEEL MAKING

[75] Inventors: Michael J. Higatsberger; Karl Rumpold, both of Vienna; Franz Viehböck, Maria Enzersdorf-Sudstadt, all of Austria

[73] Assignee: Osteereichische Studiengesellschaft Fur Atomeneegie Ges. m.b.H., Vienna, Austria

[22] Filed: Mar. 19, 1971

[21] Appl. No.: 139,230

Related U.S. Application Data

[62] Division of Ser. No. 76,997, Sept. 30, 1970.

[52] U.S. Cl................ 250/392, 250/391, 250/499, 250/501
[51] Int. Cl............................................ G01n 23/10
[58] Field of Search.............. 250/83.1, 84.5, 106 T, 250/43.5 D

[56] References Cited
UNITED STATES PATENTS

| | | | |
|---|---|---|---|
| 3,124,679 | 3/1964 | Tittman et al. | 250/83.1 X |
| 3,376,420 | 4/1968 | Frank | 250/83.1 X |
| 3,508,047 | 4/1970 | Mott et al. | 250/83.1 X |
| 3,588,509 | 6/1971 | Yanagishita | 250/84.5 |

*Primary Examiner*—Archie R. Borchelt
*Attorney, Agent, or Firm*—McGlew and Tuttle

[57] ABSTRACT

Apparatus for determining the carbon content of liquid ferrous material during the production of steel, comprising a crucible container adapted to hold said material, means for producing a neutron flux of predetermined energy, guidance means for directing said neutron flux onto said material and measuring means for measuring the gamma radiation emitted from said material upon impingement of said neutron flux thereon.

8 Claims, 4 Drawing Figures

INVENTORS
MICHAEL J. HIGATSBERGER
KARL RUMPOLD
FRANZ VIEHBOCK

BY McGlew and Torem
ATTORNEYS

APPARATUS FOR DETERMINING THE CARBON CONTENT OF A FERROUS MATERIAL DURING STEEL MAKING

This application is a division of Ser. No. 76,997, filed Sept. 30, 1970.

SUMMARY OF THE INVENTION

The present invention relates to apparatus for determining the carbon content of a material undergoing chemical processing and, more particularly, for determining the carbon content in the production of steel.

A continuous analysis of the melt is especially desirable in the automatic processes of an LD steel mill. Traditionally, samples were drawn chiefly from the melts and routinely analyzed by a variety of methods with different measuring times and with different degrees of accuracy. A serious drawback of these methods is the time lag: it takes about 5 minutes to withdraw a sample and to perform the various analyses. It has therefore not been possible in the past to follow the process dynamically and to control it by immediate feedback.

By using neutron activation methods, with thermal neutrons from a reactor, for a "prompt" $(n,\gamma)$ analysis it has been mainly possible to determine exactly the presence of 1 to 10 percent Manganese. However, this method cannot establish the presence of other elements such as Carbon, Silicon or Phosphorus in pig iron and steel because the effective cross sections of the respective nuclei are too small, as is evident from the following tables:

TABLE I

| Pig iron Element | Wt. % | Effective cross-section in barn | Activity in % |
|---|---|---|---|
| Fe | 90.6 | 2.62 | 82.7447 |
| Mn | 4 | 13.3 | 17.2237 |
| Si | 1 | 0.16 | 0.0170 |
| S | 0.2 | 0.52 | 0.0094 |
| P | 0.2 | 0.0037 | 0.0015 |
| Total | 100.00% | Total | 100.0000 % |

TABLE II

| Steel Element | Wt. % | Effective cross-section in barn | Activity in % |
|---|---|---|---|
| Fe | 95.8 | 2.62 | 91.0165 |
| Mn | 2 | 13.3 | 8.9586 |
| Si | 1 | 0.16 | 0.0177 |
| S | 0.1 | 0.52 | 0.0048 |
| P | 0.1 | 0.2 | 0.0019 |
| C | 1 | 0.0037 | 0.0004 |
| Total | 100.00 % | Total | 99.9999 % |

It is, therefore, an object of the present invention to overcome the drawbacks of prior art by providing a simple and reliable analytical apparatus for determining the carbon content in material being chemically processed.

Another object is to provide an analytical apparatus for the determination of the carbon content or iron in the liquid state.

A further object is to determine the carbon content rapidly and on a continuing basis for immediate feedback in an automatic processing system.

Still another object is to eliminate from the $(n,\gamma)$ analysis of the material interfering radiation due to the neutron generator.

These objects and others which will become apparent hereinafter are attained, in accordance with the present invention, by intermittently bombarding the material with neutrons of a predetermined energy. Capture of the neutrons by nuclei in the material which have an effective capture cross section results in many cases in the formation of radioactive nuclei which decay under emission of a gamma quantum. Table III shows a number of reactions resulting from the bombardment with neutrons of an energy of 14 Mev, the latter value referring to the energy of neutrons after leaving the neutron generator.

It is seen from Table III that the reaction $C^{12}(n,p)B^{12}$, with an effective capture cross-section of 19 millibarn results in the formation of the short-lived boron isotope $B^{12}$ which has a half-life of 0.021 sec and emits a gamma quantum of an energy of 4.43 Mev. Another reaction $O^{16}(n,p)N^{16}$, with an effective capture cross section of 42 millibarn yields the unstable isotope $N^{16}$ with a half-life of 7.1 sec and which emits gamma quanta of energies of 6.13 and 7.13 Mev. Other $(n,p)$ reactions of heavy nuclei yield radioisotopes of still longer half life, so that gamma ray activity of appreciable degree appears only after prolonged bombardment with neutrons.

In one preferred embodiment of the invention, intermittent bombardment by neutrons is attained by alternatingly switching the neutron generator between an ON and an OFF position. The period during which the generator is in either position corresponds to the approximate half-life of $B^{12}$.

BRIEF DESCRIPTION OF THE DRAWING

The above and other objects, features and advantages of the present invention will become more readily available from the following description, reference being made to the accompanying drawing in which.

DESCRIPTION OF THE PREFERRED EMBODIMENTS

Figure 1:
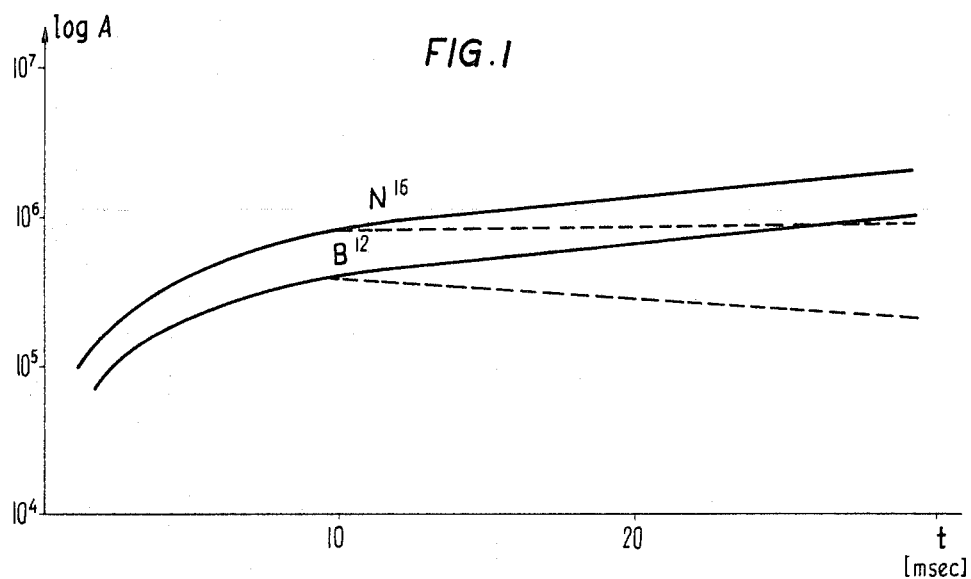
FIG. 1 is a diagram showing the dependence of the bombardment products $B^{12}$ and $N^{16}$ on the lengths of the ON and OFF times of a neutron generator.

In FIG. 1 there is shown the relation between the radionucleides $B^{12}$ and $N^{16}$ and the ON and OFF time of a neutron generator, corresponding to periods of activation of the material. The dashed lines show the decay curves during the OFF time of the generator. FIG. 1 represents data which were obtained when $5 \times 10^6$ n/cm²/sec were directed onto 5kg of Fe (which includes about 50 g C). The iron was in the form of a disk which had a diameter of 16 cm and a thickness of 3 cm, (corresponding to the half-value of the range of 4.43 Mev gamma radiation). It is evident, from FIG. 1, that the number of radiating $B^{12}$ and $N^{16}$ nuclei increases with the ON time of the neutron generator up to a saturation point. The saturation point for $B^{12}$ lies beyond 1

TABLE III

| Element | reaction | Neutron energy, mev. | barn | Product nuclide | Half-life | Gamma energy in mev. |
|---|---|---|---|---|---|---|
| $26Fe^{54}$ | n, 2n | 0.015 | 14 | $Fe^{53}$ | 8.9 m. | 0.38 |
| 5.81% | n, p | 0.373 | 14 | $Mn^{54}$ | 291 d., EC | 0.84 |
|  | n, α | 0.270 | 14 | $Cr^{51}$ | 27.8 d., EC | 0.325 |
| $26Fe^{56}$ | n, 2n | 0.5 | 14 | $Fe^{55}$ | 2.6 v., EC | 0.22 |
| 91.68% | n, p | 0.11 | 14 | $Mn^{56}$ | 2.58 h., 0.845 | 1.81; 2.13 |
| $25Mn^{55}$ | n, 2n | 0.825 | 14 | $Mn^{54}$ | 291 d., EC | 0.84 |
| 100% | n, p | 0.075 | 14 | $Cr^{55}$ | 3.52 m |  |
|  | n, α | 0.05 | 14 | $V^{52}$ | 3.75 m., 1.44 |  |
| $6C^{12}$ | n, 2n | 0.006 | 14 | $C^{11}$ | 20.5 m |  |
| 98.89% | n, p | 0.019 | 14 | $B^{12}$ | 0.022 s., 4.43 |  |
|  | n, α | 0.08 | 14 | Be | Stable |  |
| $8O^{16}$ | n, p | 0.042 | 14 | $N^{16}$ | 7.1 s., 3.3 | 7.1; 6.1 |
| 99.76% | n, α | 0.3 | 14 | $C^{13}$ | Stable |  |
| $14Si^{28}$ | n, p | 0.25 | 14 | $Al^{28}$ | 2.3 m., 1.78 |  |
| 92.27% | n, α | 0.052 | 14 | $Mg^{25}$ | Stable |  |
| $15P^{31}$ | n, 2n | 0.011 | 14 | $P^{30}$ | 2.6 m |  |
| 100% | n, p | 0.084 | 14 | $Si^{31}$ | 2.62 h |  |
|  | n, α | 0.15 | 14 | $Al^{28}$ | 2.3 m., 1.78 |  |
| $16S^{32}$ | n, p | 0.3 | 14 | $P^{32}$ | 14.3 d |  |
| 95.02% | n, α | 0.109 | 14 | $Si^{29}$ | Stable |  | sec., when the number of $B^{12}$ atoms amounts to $1.4 \times 10^6$, and for $N^{16}$ it lies beyond 100 sec. when the number of $N^{16}$ atoms is $0.8 \times 10^9$.

The decay curve for $B^{12}$ is a straight line on the semi-logarithmic scale; for $N^{16}$ which has a relatively long half-life the curve is an approximately straight line.

Sensible ON and OFF times for the generator are seen to lie in the range between 1 and 100 milliseconds, and the operation of a pulsating neutron generator bears upon the number of the resulting $B^{12}$ and $N^{16}$ atoms exactly as shown by the curves of FIG. 1.

When the ON time of the neutron generator is too long, (corresponding to a limit value for the curve in FIG. 1), the production of gamma-emitting $B^{12}$ atoms is no longer profitable; moreover, during the prolonged ON period, too many $N^{16}$ and heavier nuclei will be produced. When the ON time of the generator is too short, the production of $B^{12}$ atoms and consequently the carbon count will be too low. Conversely, if the OFF time of the generator is too long, the count at the end of the suspended activation will be too low since the decay curve is an exponential function, as is well known. But if the OFF time is too short the count will also be too low because in relation to the OFF time the ON time will predominate. Since the gamma radiation is measured only during the OFF time, the measuring time per unit time becomes too short and hence, the intensity will be found to be too low.

Figure 2:
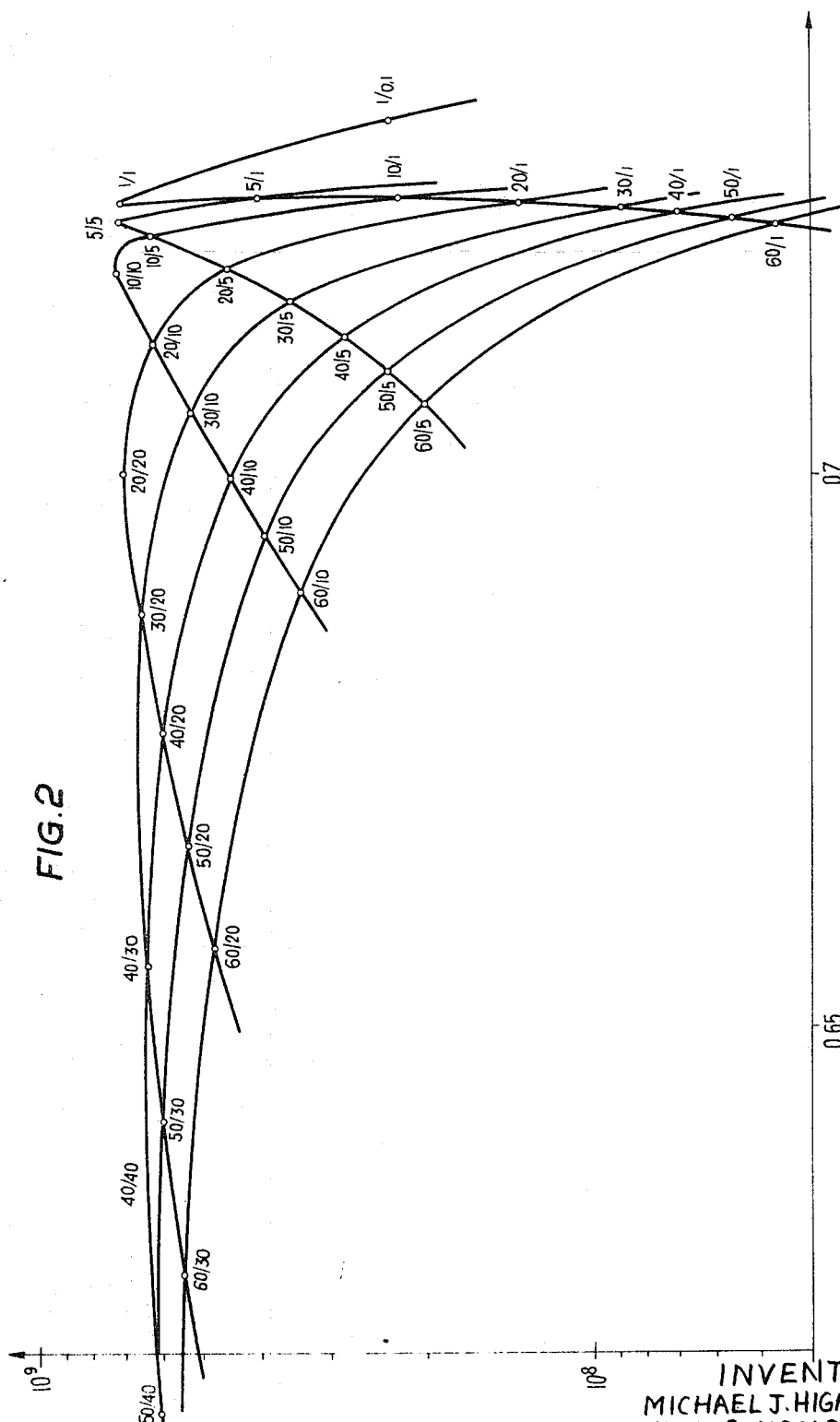
FIG. 2 is a diagram showing the number of $B^{12}$ decompositions as a function of the ratio between the carbon pulses and the oxygen pulses.

The optimal ON and OFF times for a neutron generator are shown in FIG. 2, where the $B^{12}$ emission, as a function of the ratio of the carbon pulses to the oxygen pulses, is plotted against various values of ON and OFF times. It was found that the coordinate point in FIG. 2 remains constant if ON and OFF times are reversed. FIG. 2 also shows that the most appropriate ON and OFF times are, respectively, 20, 10, 5, or 0.1 milliseconds — the values of the upper envelope of the family of curves of the figure. The yield is then about $6 \times 10^8$ pulses per minute or an average of $10^7$ pulses/sec of carbon alone over the entire solid angle. Complete calculations have shown that this intensity does not vary during the operation. By contrast, the ratio of pulses of $B^{12}$ to pulses of $N^{16}$ deteriorates progressively during the operation, although it does not reach the critical value of about 0.6. Actually, the ratio will be more favorable, because the turbulence in the melt causes the radioactive $N^{16}$ with a relatively long half-life to move to a lower region where it can be disregarded. It is, however, impossible to make a sensible estimate of the proportion, since one can hardly make any assumptions about the turbulence.

Subtracting, from the carbon value, an assumed factor for the solid angle and the efficiency of the gamma detector of about $10^4$, the yield for carbon alone is $10^3$ pulses/sec.

Figure 3:
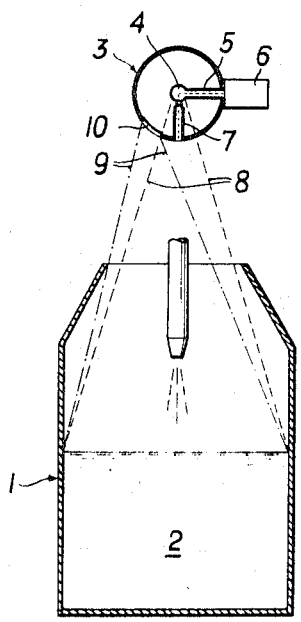
FIG. 3 is a schematic representation of one embodiment of the invention.

The illustration of FIG. 3 shows a crucible 1 containing a steel melt 2 whose carbon content is to be determined. A neutron collimator 3 spaced from the crucible 1 includes a tritium target 4 which is disposed at the apex of an angle formed by a pair of bores 5 and 7 which communicate with one another in the interior of the collimator. The target 4 is positioned in the interior of the bores 5, 7 at their junction. Bore 5 communicates, at its end opposite the junction with bore 7, with a linear accelerator 6 positioned outside the crucible 1.

Bore 7 defines a passage between the collimator 3 and the melt 2. The gamma radiation 9 which is produced by the reaction $C^{12}(n,p)B^{12}$ and the subsequent $B^{12}$ decay is intercepted by a detector 10 which is advantageously a semi-conductor or a scintillator detector. The best results have been obtained up to now with a Ge(li) semi-conductor detector.

The collimator 3 is preferably a spherical tank with a diameter of about 153 cm which is filled with water. When a stream of deuterium of about 2mA is issued from the linear accelerator 6 and passed through a tube 15 of about 8 cm diameter onto the tritium target 4, a neutron flux of about $10^{11}$ n/sec with an energy of 14 Mev is emitted in accordance with the reaction $H^3(d,n)He^4$. The flux is emitted isotropically over the entire solid angle. Those neutrons 8 which pass through bore 7 arrive in the melt 2 without loss of the 14 Mev energy. The other neutrons resulting from the reaction are slowed down in the water of the collimator 3. When boron is added to the water the decelerated thermal neutrons are absorbed by the $(n,\alpha)$ reaction of boron. The range of the alpha radiation which is produced is so short that the particles do not pass through the collimator tank 3 to the outside. The spherical collimator 3 further includes a recess (not designated) which forms a radiation shield for the oxygen lance 11 through which oxygen can be injected into the melt 2.

At 1 m distance from the collimator 3, the radiation level is only 0.2 percent of the value which, according to international radiation protection standards, is admissible as a perfectly harmless yet maximum long-term dose.

Figure 4:
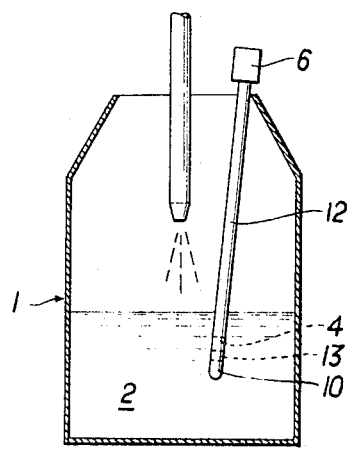
FIG. 4 is a schematic representation of another embodiment of the invention.

In the embodiment of the invention shown in FIG. 4, the tritium target 4 and the detector 10 are immersed in the melt 2. The detector 10 is protected from the target 4 by shielding 3 which may include $Li^6$, $H_2O$, paraffin or graphite. The target 4 as well as the detector 10 are disposed in a tubular pipe 12. At its end distant from the melt 2 pipe 12 is connected to the linear accelerator 6 outside the crucible 1. The arrangement according to FIG. 4 is advantageous because of the satisfactory neutron economy and because of the problem of deceleration of the 14 Mev neutrons.

If the gamma radiation intercepted by the detector is to be used to control a LD steelmaking process the signals from the detector are amplified and fed via an analog-to-digital converter to a digital computer for actuation of process control means, for example for injection of oxygen into the melt through the oxygen lance. If a measurement of the gamma radiation is required instead of process control, an appropriate measuring instrument, e.g., a multichannel pulse analyzer must be inserted in the electronic circuit. From the measured gamma radiation the carbon content of the material can be deduced by simple calculation.

While the determination of the carbon content in chemical processes may be carried out in a variety of materials, the method has been found to be particularly advantageous for the determination and control of processes involving iron in the liquid state.

What is claimed is:

1. Apparatus for determining the carbon content of liquid ferrous material during the production of steel, comprising a crucible container adapted to hold said material, means for producing a neutron flux of predetermined energy, guidance means for directing said neutron flux onto said material and measuring means for measuring the gamma radiation emitted from said material upon impingement of said neutron flux thereon.

2. Apparatus according to claim 1 wherein said container is at least partially filled with liquid ferrous material.

3. The apparatus as defined in claim 2, wherein said means for producing a neutron flux of predetermined energy comprise a source of deuterium, a linear accelerator for increasing the energy of said deuterium, a target adapted to receive said energized deuterium from said accelerator, a first means for directing said deuterium from said source to said accelerator, and a second means for directing said deuterium from said accelerator to said target, and wherein said measuring means comprise a gamma ray detector.

4. The apparatus as defined in claim 3, wherein said linear accelerator, said target and said detector are positioned outside said crucible container.

5. The apparatus as defined in claim 3, further comprising a collimator intermediate said linear accelerator and said container, said collimator including a first bore and a second bore connected to one another at an angle in the interior of said collimator, said target being disposed inside said bores at the apex of said angle, said first bore defining a passage for said deuterium from said accelerator to said target, and said second bore defining a passage for neutrons emitted from said target upon impingement of said energized deuterium thereon, into said container.

6. The apparatus as defined in claim 5, wherein said detector is disposed proximate said collimator.

7. The apyaratus as defined in claim 3, wherein said target and said detector are disposed in the interior of said container.

8. The apparatus as defined in claim 3, comprising an open-ended tubular pipe having a first section and a second section communicating with each other, said first section being immersed in said material in said container and said second section extending outward of said container, said target and said detector being disposed in said first section, and said apparatus further comprising means for connecting said open end of said second section with said linear accelerator.

* * * * *